(12) United States Patent
Yamane et al.

(10) Patent No.: US 7,215,885 B2
(45) Date of Patent: May 8, 2007

(54) WAVELENGTH DIVISION ELEMENT AND OPTICAL MODULE

(75) Inventors: Takashi Yamane, Kawasaki (JP); Toshiya Kishida, Kawasaki (JP); Satoshi Monma, Miyazaki (JP); Kazuyuki Nakasendou, Kanagawa (JP); Daiki Furusato, Kanagawa (JP)

(73) Assignees: Fujitsu Limited, Kawasaki (JP); Epson Toyocom Corporation, Hino (JP)

( * ) Notice: Subject to any disclaimer, the term of this patent is extended or adjusted under 35 U.S.C. 154(b) by 154 days.

(21) Appl. No.: 10/898,336

(22) Filed: Jul. 26, 2004

(65) Prior Publication Data
US 2005/0117201 A1    Jun. 2, 2005

(30) Foreign Application Priority Data
Dec. 2, 2003    (JP)    ............... 2003-403834

(51) Int. Cl.
H04J 14/02    (2006.01)
(52) U.S. Cl. .............. 398/85; 398/86; 398/87; 398/88; 398/139; 385/31; 385/39; 385/47
(58) Field of Classification Search ............ 385/24, 385/31–39, 42, 47; 398/85–88, 139
See application file for complete search history.

(56) References Cited

U.S. PATENT DOCUMENTS

| | | | |
|---|---|---|---|
| 4,244,045 A * | 1/1981 | Nosu et al. .................... 398/86 |
| 4,790,616 A * | 12/1988 | Frenkel et al. ................ 385/47 |
| 5,880,889 A * | 3/1999 | Neumann et al. ........... 359/634 |
| 6,539,145 B1 * | 3/2003 | Auracher et al. ............. 385/24 |
| 6,647,175 B1 * | 11/2003 | LoRegio et al. .............. 385/24 |
| 6,751,379 B2 * | 6/2004 | Capewell et al. ............. 385/36 |
| 6,842,559 B1 * | 1/2005 | Florence ....................... 385/24 |
| 6,928,210 B2 * | 8/2005 | Kropp .......................... 385/24 |
| 2002/0067886 A1 * | 6/2002 | Schaub ......................... 385/33 |
| 2003/0231841 A1 * | 12/2003 | Nakanishi et al. ........... 385/92 |
| 2004/0114932 A1 * | 6/2004 | Tanaka et al. ................ 398/85 |
| 2004/0204776 A1 * | 10/2004 | Sri-Jayantha et al. ........ 700/60 |
| 2005/0063423 A1 * | 3/2005 | Minakawa et al. ......... 370/534 |

FOREIGN PATENT DOCUMENTS

JP    2002-243974    8/2002

OTHER PUBLICATIONS

Optical Thin Film, Chapter 2: Optical Properties of Multilayer Film, Kozo Ishiguro, Hideo Ikeda and Hideshi Yokota.

* cited by examiner

Primary Examiner—Frank G. Font
Assistant Examiner—Guy G. Anderson
(74) Attorney, Agent, or Firm—Staas & Halsey LLP (57) ABSTRACT

A wavelength division element includes a first filter and a second filter. The first filter has incident angle-to-transmission wavelength characteristics and separates multiplexed lights in a plurality of wavelength bands into first lights that are in a first wavelength band and first reflected lights. The first filter allows the first lights to pass through in a first direction and reflects the first reflected lights in a second direction. The second filter is located in the second direction and separates the first reflected lights into second lights that are in a second wavelength band and second reflected lights. The second filter allows the second lights to pass through in a third direction and reflects the second reflected lights in a fourth direction.

22 Claims, 9 Drawing Sheets

WAVELENGTH DIVISION ELEMENT AND OPTICAL MODULE

CROSS-REFERENCE TO RELATED APPLICATIONS

This application is based upon and claims the benefit of priority from the prior Japanese Patent Application No. 2003-403834, filed on Dec. 2, 2003, the entire contents of which are incorporated herein by reference.

BACKGROUND OF THE INVENTION

1) Field of the Invention

The present invention relates to a wavelength division element and an optical module, each of which is incorporated in an optical component used for wavelength multiplexing optical communication, and which separates multiplexed lights in a plurality of wavelength bands.

2) Description of the Related Art

Recently, a high-density wavelength multiplexing optical communication system such as a wavelength division multiplexing ("WDM") has been introduced as an optical transmission system. To realize WDM transmission, it is required that optical components provided on an optical communication path control a plurality of wavelengths. Each of these optical components has a function of multiplexing and demultiplexing (separating) a plurality of wavelengths (see Japanese Patent Application Laid-open No. 2002-243974). This multiplexing and demultiplexing function has the following advantage. Transmission signals of different types according to wavelengths, e.g., those for telephone, the Internet, VOD (video on-demand) can be subjected to wavelength multiplexing on one optical fiber, and the wavelength-multiplexed signal can be transmitted.

Figure 15:
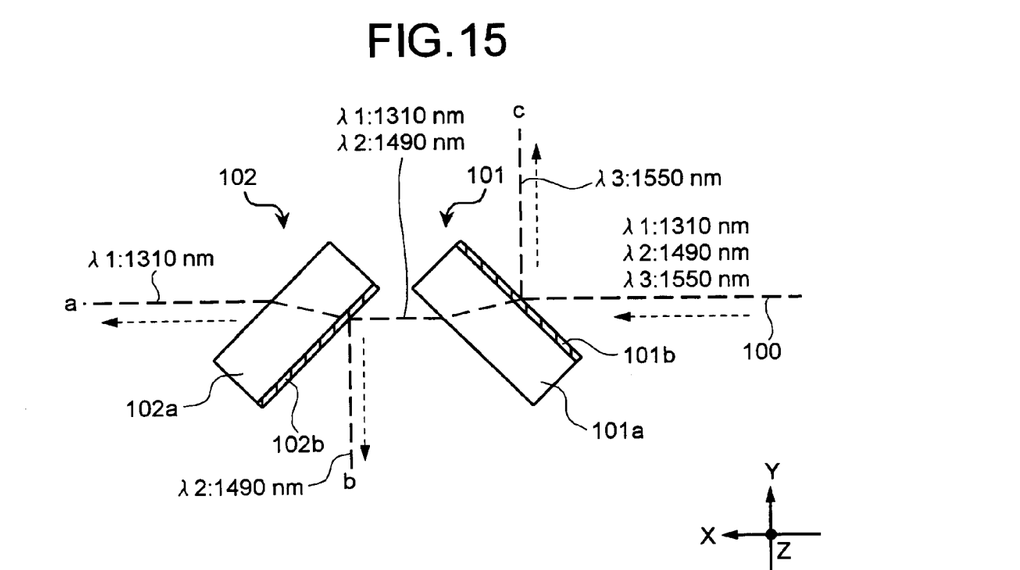
FIG. 15 illustrates one example of a conventional wavelength division element.

FIG. 15 depicts an example of the configuration of a conventional wavelength division element that separates light signals having different wavelengths (in a 1.3-micrometer band, 1.49-micrometer band, and a 1.55-micrometer band, respectively, designated according to ITU-T recommendation G 983.3) according to respective wavelengths. It is assumed that an optical wavelength band $\lambda 1$ is the 1.3-micrometer band (1310-nanometer (nm) band: 1260 nm to 1360 nm), an optical wavelength band $\lambda 2$ is the 1.49-micrometer band (1490-nm band: 1480 nm to 1500 nm), and an optical wavelength band $\lambda 3$ is the 1.55-micrometer band (1550-nm band: 1539 nm to 1620 nm). The wavelength division method is normally carried out on an optical path 100 using two filters 101 and 102 having different wavelength division characteristics. The filter films 101b and 102b of the filters 101 and 102 are formed on surfaces of glass substrates 101a and 102a serving as optical transmission members, respectively (see Kozo Ishiguro et al.: "Optical Thin Film", Chapter 2: Optical Properties of Multilayer Film, Kyoritu Shuppan Co., Ltd., Feb. 25, 1985).

Figure 16:
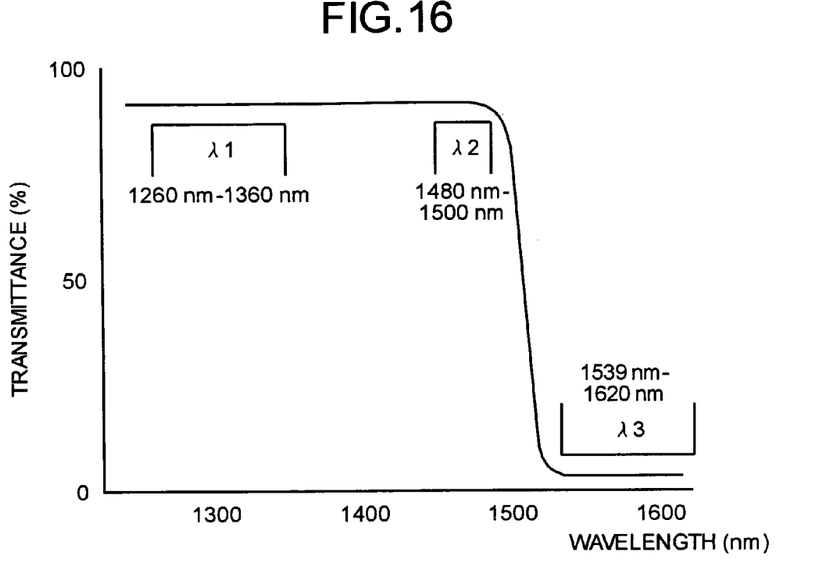
FIG. 16 is a graph of wavelength characteristics of one filter illustrated in FIG. 15.
Figure 17:
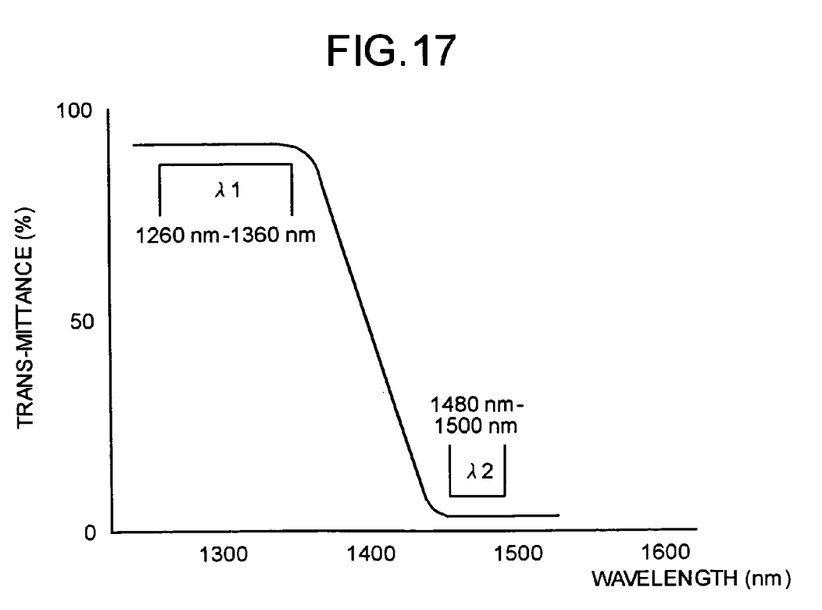
FIG. 17 is a graph of wavelength characteristics of another filter illustrated in FIG. 15.

FIGS. 16 and 17 are graphs of the wavelength characteristics of the two filters 101 and 102 shown in FIG. 15, respectively. Each of the filters 101 and 102 possesses wavelength characteristics of a short wave pass filter ("SWPF"), and transmits short wavelengths. That is, each of the filters 101 and 102 possesses a 1×2 wavelength division function for one input and two outputs.

The filter 101, which is disposed in front with respect to the incident lights, transmits a light in the wavelength band $\lambda 1$ (1.3-micrometer band) and a light in the wavelength band $\lambda 2$ (1.49-micrometer band), and reflects the light in the wavelength band $\lambda 3$ (1.55-micrometer band) in a direction c. The light in the wavelength band $\lambda 1$ (1.3-micrometer band) and the light in the wavelength band $\lambda 2$ (1.49-micrometer band) are incident on the filter 102 disposed in rear of the filter 101. The filter 102 transmits the light in the wavelength band $\lambda 1$ (1.3-micrometer band), and reflects the light in the wavelength band $\lambda 2$ (1.49-micrometer band) in a different direction, b. The light in the wavelength band $\lambda 1$ (1.3-micrometer band) is emitted in a direction that is an extension of an incident direction of the optical path 100, relative to the filters 101 and 102.

As shown in FIG. 15, it is preferable that the direction b of transmitting the light in the wavelength band $\lambda 2$ (1.49-micrometer band) and the direction (direction c) of transmitting the light in the wavelength band $\lambda 3$ (1.55-micrometer band) are oriented in a direction Y, orthogonal to an optical axis X of the optical path 100. Namely, if the optical axis is the X-axis, the axis in the direction orthogonal to the optical axis is a Y-axis, and an axis in a height direction is a Z-axis, optical axis adjustments along directions of these optical axes X, Y, and Z can be normally made easily.

However, with the wavelength division element constituted as shown in FIG. 15, it is difficult to attain the wavelength characteristics of the filter 101 to accurately carry out wavelength division. As shown in FIG. 16, the filter 101 is required to possess the wavelength characteristics of transmitting the light in the wavelength band $\lambda 1$ (1.3-micrometer band) and that in the wavelength band $\lambda 2$ (1.49-micrometer band), and of not transmitting (reflecting) the light in the wavelength band $\lambda 3$ (1.55-micrometer band). A divided wavelength width between the wavelength band $\lambda 2$ (1490-nm band: 1480 nm to 1500 nm) and the wavelength band $\lambda 3$ (1550-nm band: 1539 nm to 1620 nm) is as small as 39 nm. To realize such wavelength characteristics, a special manufacturing technique, to enable a rapid change in transmission characteristics between the wavelength bands $\lambda 2$ and $\lambda 3$, is required. Therefore, cost increases due to yield of the filter 101.

Furthermore, the conventional wavelength division element is constituted so that the two filters 101 and 102 are arranged along the optical path 100 on which a plurality of wavelength bands $\lambda 1$, $\lambda 2$, and $\lambda 3$ are multiplexed and the wavelength-multiplexed light signals are incident. Therefore, the disadvantage in the conventional wavelength division element is that the filters need lot of space along the optical path 100, thereby increasing the size of the wavelength division element. Moreover, the number of parts cannot be reduced, and efficiency of manufacturing and assembly does not improve.

SUMMARY OF THE INVENTION

It is an object of the invention to at least solve the problems in the conventional technology.

A wavelength division element according to an aspect of the present invention includes a first filter, having incident angle-to-transmission wavelength characteristics, that separates multiplexed lights in a plurality of wavelength bands into first lights that are in a first wavelength band and first reflected lights, wherein the first filter allows the first lights to pass through in a first direction and reflects the first reflected lights in a second direction; and a second filter, provided in the second direction, that separates the first reflected lights into second lights that are in a second wavelength band and second reflected lights, wherein the second filter allows the second lights to pass through in a third direction and reflects the second reflected lights in a fourth direction.

An optical module according to an aspect of the present invention includes a wavelength division element that includes a first filter, having incident angle-to-transmission wavelength characteristics, that separates multiplexed lights in a plurality of wavelength bands into first lights that are in a first wavelength band and first reflected lights, wherein the first filter allows the first lights to pass through in a first direction and reflects the first reflected lights in a second direction; and a second filter, provided in the second direction, that separates the first reflected lights into second lights that are in a second wavelength band and second reflected lights, wherein the second filter allows the second lights to pass through in a third direction and reflects the second reflected lights in a fourth direction; and wherein light receiving elements, provided in the first, the third, and the fourth directions with respect to the wavelength division element, receive the first lights, the second lights, and the second reflected lights, respectively.

The other objects, features, and advantages of the present invention are specifically set forth in or will become apparent from the following detailed description of the invention when read in conjunction with the accompanying drawings.

DETAILED DESCRIPTION

Exemplary embodiments of a wavelength division element and an optical module according to the present invention will be explained hereinafter in detail with reference to the accompanying drawings. It is assumed herein that wavelength-multiplexed lights in a plurality of wavelength bands, i.e., the wavelength band $\lambda 1$ (1.3-micrometer band: 1260 nm to 1360 nm), the wavelength band $\lambda 2$ (1.49-micrometer band: 1480 nm to 1500 nm), and the wavelength band $\lambda 3$ (1.55-micrometer band: 1539 nm to 1620 nm) are incident on the wavelength division element in a manner similar to the conventional art. The wavelength division element separates the light in the respective wavelength bands $\lambda 1$, $\lambda 2$, and $\lambda 3$ based on wavelengths, and transmits (outputs) the resultant lights in different directions, respectively.

Figure 1:
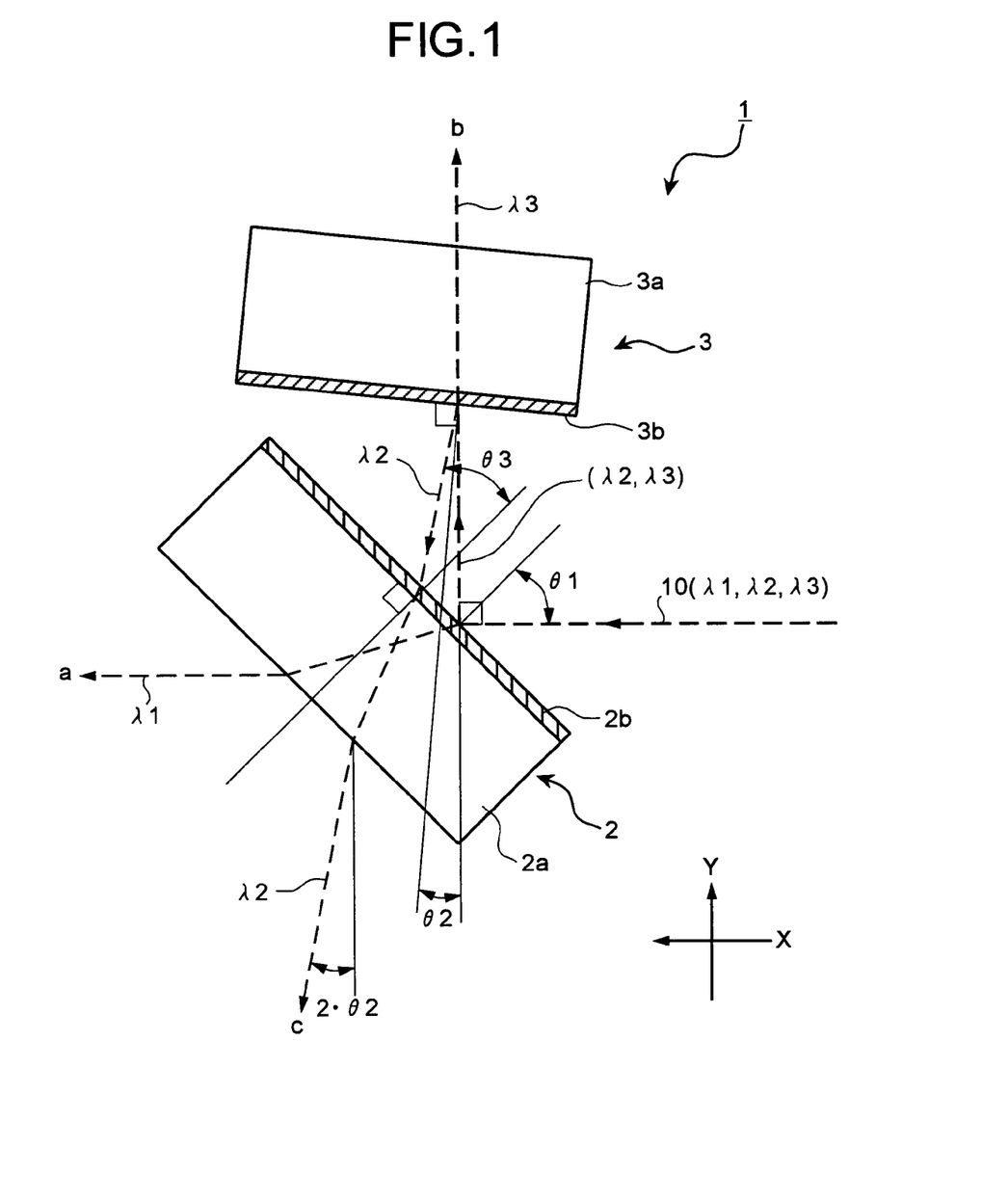
FIG. 1 is a block diagram of a wavelength division element according to a first embodiment of the present invention.

A first embodiment of the present invention will be explained. FIG. 1 is a block diagram of a wavelength division element according to a first embodiment. A wavelength division element 1 includes two filters 2 and 3. In the filters 2 and 3, filter films 2b and 3b are formed on optical transmission members 2a and 3a, respectively. The optical transmission members 2a and 3a are formed of substrates of quartz or glass. Each of the optical transmission members 2a and 3a has a substrate size of, for example, a one-millimeter width×a one-millimeter length×a 0.5-millimeter thickness. Each of the filter films 2b and 3b is a plate film, formed by a multilayer film made of, for example, $SiO_2$ or $TiO_2$.

The filter 2 is provided on an optical path 10 on which the lights in the wavelength bands $\lambda 1$, $\lambda 2$, and $\lambda 3$ are multiplexed. The filter film 2b of the filter 2 transmits the light in the wavelength band $\lambda 1$ in a direction a, and reflects the lights in the remaining wavelength bands $\lambda 2$ and $\lambda 3$. The reflected lights in the wavelength bands $\lambda 2$ and $\lambda 3$ are incident on the filter 3. The filter 3 transmits the light in the wavelength band $\lambda 3$ in a direction b, and reflects the light in the wavelength band $\lambda 2$. The reflected light in the wavelength band $\lambda 2$ is incident on the filter 2 once again, with an incident angle such that the light can pass through the filter 2, and is transmitted by the filter 2 in a direction c.

Thus, the filter 2 reflects the light in the wavelength band $\lambda 2$ at a certain incident angle, as well as, when the light in the wavelength band $\lambda 2$ reflected by the filter 3 approaches the filter 2 with a different incident angle, the filter 2 transmits the light in the wavelength band $\lambda 2$. That is, the filter film 2b has an incident angle dependency of reflecting or transmitting a light based on the incident angle of the light. This can facilitate reflecting and transmitting a light by setting only the filter film 2b such that incident angles of the light are appropriate for reflection and transmission.

The arrangement of the filters 2 and 3 will be explained next with reference to FIG. 1. The optical path 10 of the wavelength-multiplexed lights is along the X-axis. An angle $\theta 1$, between the optical path 10 of the incident lights and a normal of the filter film 2b of the filter 2, is 45 degrees. The filter film 2b of the filter 2 reflects the light in the wavelength band $\lambda 2$ and the light in the wavelength band $\lambda 3$, in the direction of the orthogonal Y-axis, towards the filter 3. An angle $\theta 2$, between the Y-axis and the normal direction of the filter film 3b of the filter 3, is 6 degrees. The light in the wavelength band $\lambda 2$ reflected by the filter film 3b of the filter 3 is inclined at 12 degrees (2·$\theta 2$) relative to the Y-axis, that is a twofold of the angle $\theta 2$. Therefore, when the light in the wavelength band $\lambda 2$ is incident again on the filter film 2b of the filter 2, an angle $\theta 3$ of an incident direction of the light in the wavelength band $\lambda 2$ with respect to the normal direction of the filter film 2b of the filter 2 is 33 degrees (45−12=33 degrees). The filter film 2b thus possesses wavelength characteristics of reflecting the light in the wavelength band $\lambda 2$ with incident angle of 45 degrees, and of transmitting the light incident on the filter film 2b at an incident angle that is smaller (33 degrees) than 45 degrees.

Figure 2:
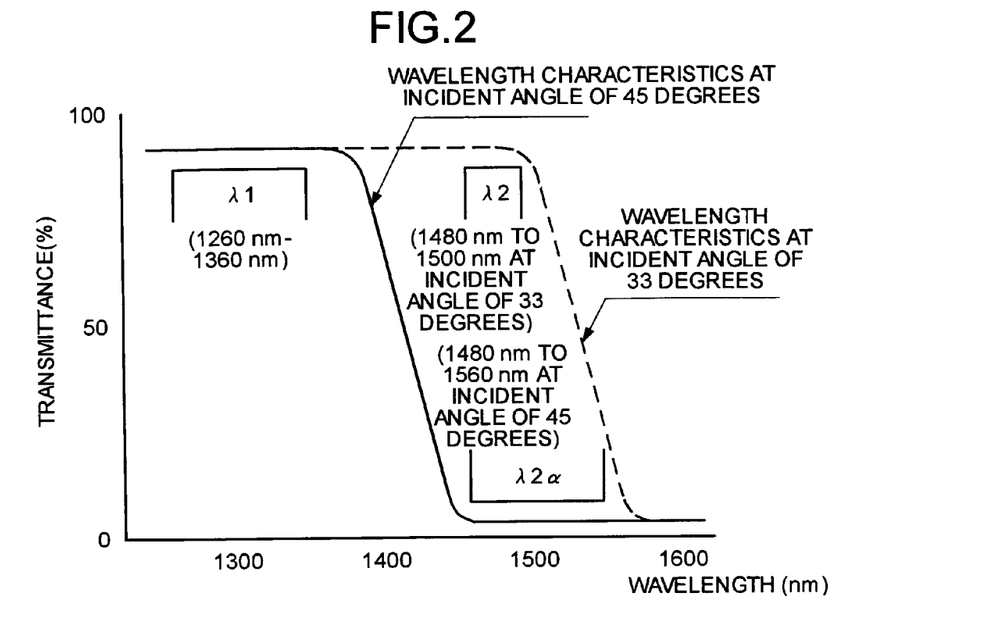
FIG. 2 is a graph of wavelength characteristics of one of two filters illustrated in FIG. 1 and FIG. 5.

The wavelength characteristics of the respective filters 2 and 3 will now be explained. FIG. 2 is a graph of the wavelength characteristics of one of the filters (filter 2). In the graph, the horizontal axis indicates wavelength and the vertical axis indicates transmittance. The filter film 2b formed on the filter 2 has an incident angle dependency with different transmittance depending upon incident angles. A solid line denotes the wavelength characteristics of the filter 2 if the incident angle of the light relative to the filter 2 is 45 degrees, and a dotted line denotes the wavelength characteristics of the filter 2 if the incident angle is 33 degrees.

As shown in FIG. 2, at the incident angle of 45 degrees, the filter 2 possesses SWPF wavelength characteristics of transmitting the light in the wavelength band $\lambda 1$ (1.3-micrometer band: 1260 nm to 1360 nm), and of not transmitting a light in a wavelength band, $\lambda 2\alpha$ equal to or longer than the wavelength band $\lambda 2$ (1.49-micrometer band: 1480 nm to 1500 nm). That is, at the incident angle of 45 degrees, the filter 2 has high transmittance for the light in the wavelength band $\lambda 1$ and low transmittance for light in the wavelength band $\lambda 2\alpha$. At the incident angle of 33 degrees, the filter 2 possesses wavelength characteristics shifted from those of the filter 2 at the incident angle of 45 degrees, by about 150 nm in a long wavelength direction. At the incident angle of 33 degrees, the filter 2 has wavelength characteristics of transmitting (i.e., having a high transmittance for) lights having long wavelengths in wavelength bands equal to or longer than the wavelength band $\lambda 2$ (1.49-micrometer band: 1480 nm to 1500 nm).

Figure 3:
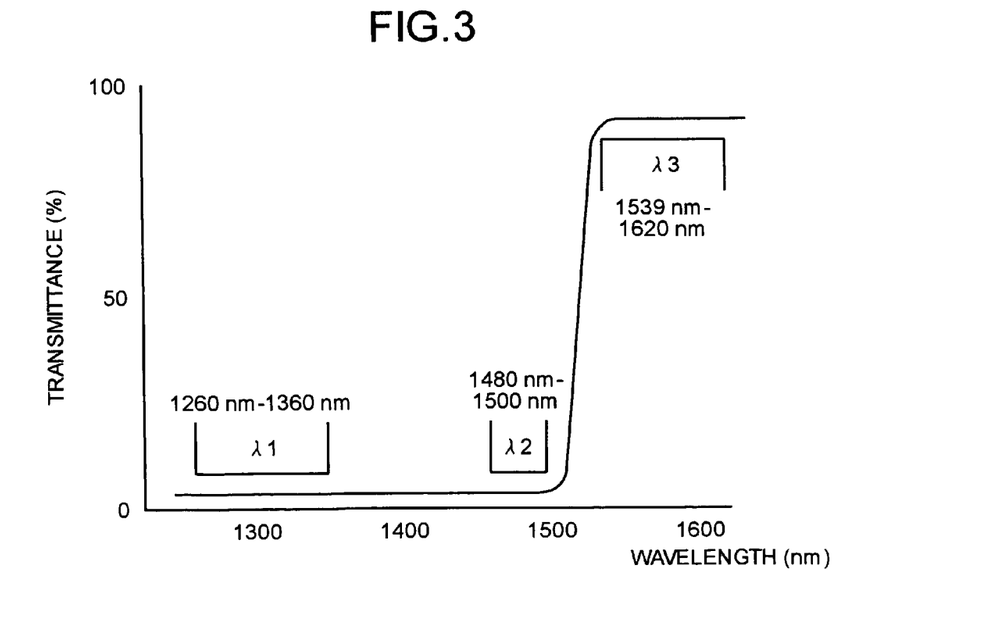
FIG. 3 is a graph of wavelength characteristics of the other filter illustrated in FIG. 1 and FIG. 5.

FIG. 3 is a graph of the wavelength characteristics of the other filter (filter 3). In the graph, the horizontal axis indicates wavelength and the vertical axis indicates transmittance. FIG. 3 depicts the wavelength characteristics of the filter 3 if the incident angle of light relative to the filter 3 is 6 degrees. At the incident angle of 6 degrees, the filter 3 has wavelength characteristics as a long wave pass filter ("LWPF") of not transmitting (having a low transmittance for and reflecting) lights having short wavelengths in bands equal to or shorter than the wavelength band $\lambda 2$ (1.49-micrometer band: 1480 nm to 1500 nm), and of transmitting (having a high transmittance for) lights having long wavelengths in wavelength bands equal to or longer than the wavelength band $\lambda 3$ (1.55-micrometer band, i.e., 1550 nm band: 1539 nm to 1620 nm). Since the filter 2 transmits the light in the wavelength band $\lambda 1$ (1.3-micrometer band: 1260 nm to 1360 nm), the light in the wavelength band $\lambda 1$ is not incident on the filter 3.

Thus, as shown in FIG. 1, the filter 2 transmits and emits in the direction a, the light in the wavelength band $\lambda 1$ among those incident at the incident angle $\theta 1$ of 45 degrees. The filter 2 does not transmit but reflects the lights in the wavelength bands $\lambda 2$ and $\lambda 3$ towards the filter 3. The lights in the wavelength bands $\lambda 2$ and $\lambda 3$ are incident on the filter 3 at the incident angle of 6 degrees. The filter 3 transmits and emits in the direction b, only the light in the wavelength band $\lambda 3$. The filter 3 does not transmit but reflects the light in the wavelength band $\lambda 2$ in the direction of the filter 2. The light in the wavelength band $\lambda 2$ reflected by the filter 2 is incident on the filter 2 at the incident angle $\theta 3$ of 33 degrees. The filter 2 transmits and emits in the direction c, the light in the wavelength band $\lambda 2$. The lights in each wavelength after the wavelength division can be arranged relative to the incident direction of the lights on the optical path 10 along the X-axis so that the direction a is in the direction of the X-axis and so that the directions b and c are in the direction of the Y-axis orthogonal to the X-axis.

Figure 4:
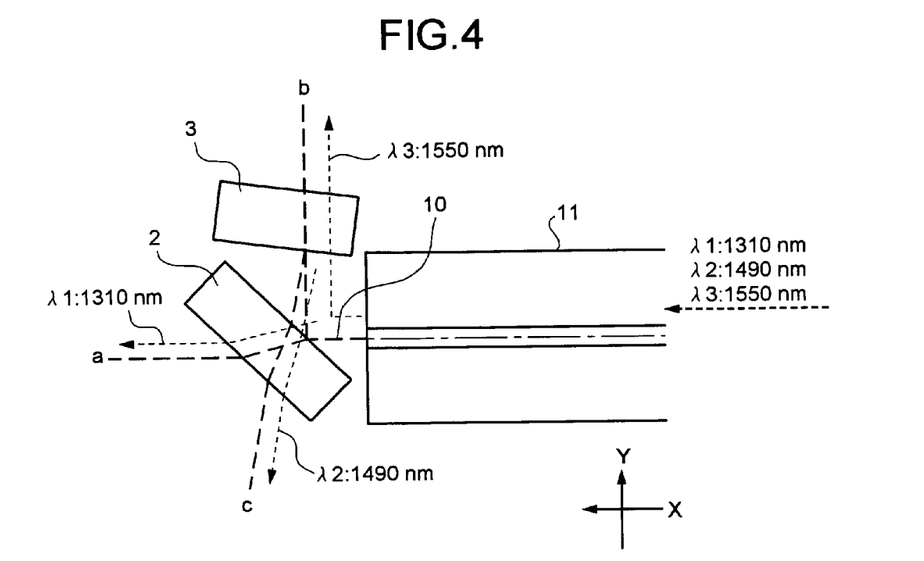
FIG. 4 illustrates an example of a configuration of the wavelength division element.

FIG. 4 illustrates an example of a configuration of the wavelength division element. The wavelength division element may be constituted so that lights emitted from an optical fiber 11 provided along the X-axis direction are incident on the filter 2. The light obtained by multiplexing the lights in the wavelength bands $\lambda 1$, $\lambda 2$, and $\lambda 3$ is transmitted through the optical fiber 11, and the multiplexed lights are emitted from a facet of the optical fiber 11 toward the filter 2 in the optical path 10.

The light in the wavelength band $\lambda 1$ is transmitted in the direction a, the light in the wavelength band $\lambda 2$ in the direction c, and the light in the wavelength band $\lambda 3$ in the direction b. By arranging light receiving elements such as photodiodes ("PD") in the directions a, b, and c, respectively, different optical signals can be detected based on the respective wavelengths. By arranging light emitting elements such as laser diodes ("LD"), the wavelength division element can emit (output) the light in any one of the wavelength bands towards the optical fiber 11.

With the configuration of the first embodiment of the present invention, the filter 2 possesses the wavelength characteristics of transmitting the lights in different wavelength bands based on the incident angles. Thus, the same filter (filter 2) can separate the lights in two different wavelength bands by changing the incident angles of the lights incident on the filter 2 and the lights reflected by the filter 3. A divided wavelength width when carrying out the wavelength division using the filter 2 is as large as 120 nm. The divided wavelength width (see FIG. 2) is between the largest wavelength of 1360 nm in the wavelength band $\lambda 1$ and the smallest wavelength of 1480 nm in the wavelength band $\lambda 2$. Thus, the filter 2 can widen the divided wavelength width, and improve optical isolation characteristics in the respective wavelength bands $\lambda 1$, $\lambda 2$, and $\lambda 3$. Further, the other filter 3 is provided in the direction of the lights that are deviated from the optical path 10 of the incident lights and reflected by the filter 2. Therefore, the distance of the filter 3 from the optical path 10 decreases, whereby a size of the wavelength division element reduces.

Figure 5:
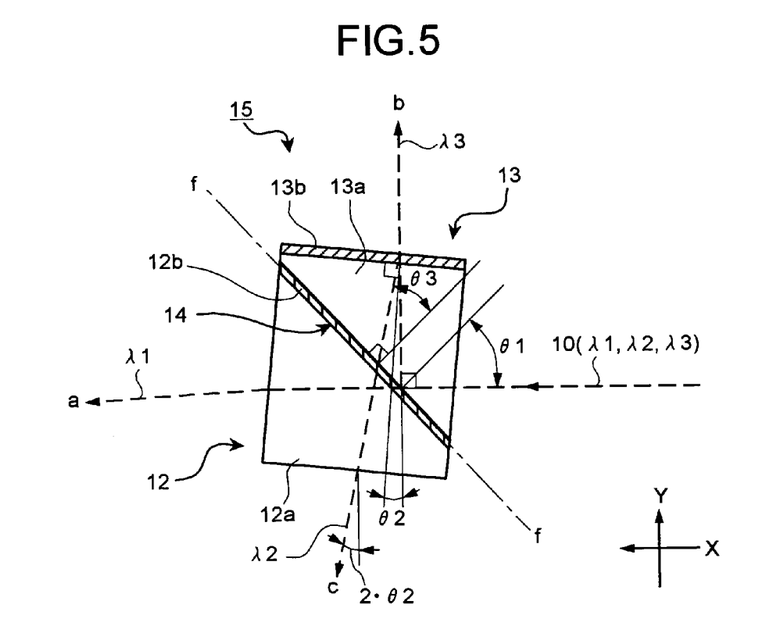
FIG. 5 is a block diagram of a wavelength division element according to a second embodiment.

A second embodiment of the present invention will be explained hereinafter. Like elements as those in the first embodiment are designated by like reference symbols. FIG. 5 is a block diagram of a wavelength division element according to a second embodiment. Similarly to the first embodiment, the wavelength division element 15 according to the second embodiment includes two filters 12 and 13. Filter films 12b and 13b are formed on optical transmission members 12a and 13a of the filters 12 and 13, respectively.

The second embodiment differs from the first embodiment only in shape of the optical transmission members 12a and 13b. The optical transmission members 12a and 13a are made of quartz or glass similar to the transmission members 2a and 3a. Each of the two optical transmission members 12a and 13a can be obtained by working glass into a cube, and cutting the cube along a line f—f as shown in FIG. 5. Division surfaces 14 on which the cube is divided are coupled with each other after division as shown in FIG. 5. In a state in which the optical transmission member 12a is coupled with the optical transmission member 13a, the wavelength division element is a cubic prism.

The filter film 12b is provided on the division surface 14 on the optical transmission member 12a. The filter film 13b is provided on a surface towards which the lights reflected by the filter film 12b are emitted. The angle $\theta 1$ between a normal line of the surface of the filter film 12b and the X-axis (in the incident direction of the optical path 10) is 45 degrees. The angle $\theta 2$ between a normal of the filter film 13b and the Y-axis is 6 degrees. The light in the wavelength band $\lambda 2$ reflected by the filter film 13b of the filter 13 is inclined at an angle 2·θ2 of 12 degrees relative to the Y-axis. Therefore, when the light in the wavelength band $\lambda 2$ is incident again on the filter film 12b of the filter 12, the angle θ3 between the incident direction of this light and the normal direction of the filter film 12b of the filter is 33 degrees (45−12=33 degrees). Thus, the filter film 12b has characteristics of reflecting the light in the wavelength band $\lambda 2$ at the incident angle of 45 degrees, and of transmitting the light incident at a smaller angle (33 degrees) than 45 degrees. Similar to the first embodiment, the filter films 12b and 13b are multilayer films made of $SiO_2$ or $TiO_2$.

The wavelength characteristics of the filters 12 and 13 are the same as those of the filters 2 and 3 respectively, of the first embodiment. The wavelength characteristics of filter 12 are shown in FIG. 2, and those of the filter 13 are shown in FIG. 3. The filter film 12b formed on the filter 12 has an incident angle dependency with different transmittances depending upon incident angles.

As shown in FIG. 2, at the incident angle of 45 degrees, the filter 12 possesses SWPF wavelength characteristics of transmitting (i.e., having a high transmittance for) the light in the wavelength band $\lambda 1$ (1.3-micrometer band: 1260 nm to 1360 nm), and of not transmitting (i.e., having a low transmittance for and reflecting) a light in a wavelength band $\lambda 2\alpha$ and that is equal to or longer than the wavelength band $\lambda 2$ (1.49-micrometer band: 1480 nm to 1500 nm). At the incident angle of 33 degrees, the filter 12 possesses wavelength characteristics shifted from those of the filter 2 at the incident angle of 45 degrees by about 150 nm in a long wavelength direction. At the incident angle of 33 degrees, the filter 12 has wavelength characteristics of transmitting (i.e., having a higher transmittance for) lights having long wavelengths in wavelength bands equal to or longer than the wavelength band $\lambda 2$ (1.49-micrometer band: 1480 nm to 1500 nm).

As shown in FIG. 3, at the incident angle of 6 degrees, the filter 13 possesses the LWPF wavelength characteristics of not transmitting (having a low transmittance for and reflecting) lights having short wavelengths in bands equal to or shorter than the wavelength band $\lambda 2$ (1.49-micrometer band: 1480 nm to 1500 nm), and of transmitting (having a high transmittance for) lights having long wavelengths in wavelength bands equal to or longer than the wavelength band $\lambda 3$ (1.55-micrometer band: 1539 nm to 1620 nm). Since the filter 12 transmits the light in the wavelength band $\lambda 1$ (1.3-micrometer band: 1260 nm to 1360 nm), the light in the wavelength band $\lambda 1$ is not incident on the filter 13.

Thus, as shown in FIG. 5, the filter 12 transmits and emits in the direction a, the light in the wavelength band $\lambda 1$ among those incident at the incident angle θ1 of 45 degrees. The filter 12 does not transmit but reflects the lights in the wavelength bands $\lambda 2$ and $\lambda 3$ towards the filter 13. The lights in the wavelength bands $\lambda 2$ and $\lambda 3$ are incident on the filter 13 at the incident angle of 6 degrees. The filter 13 transmits and emits in the direction b, only the light in the wavelength band $\lambda 3$. The filter 13 does not transmit but reflects the light in the wavelength band $\lambda 2$ in the direction of the filter 12. The light in the wavelength band $\lambda 2$ reflected by the filter 12 is incident on the filter 12 at the incident angle θ3 of 33 degrees. The filter 12 transmits and emits in the direction c, the light in the wavelength band $\lambda 2$. The lights in each wavelength after the wavelength division can be arranged relative to the incident direction of the lights on the optical path 10 along the X-axis so that the direction a is in the direction of the X-axis and so that the directions b and c are in the direction of the Y-axis orthogonal to the X-axis.

Figure 6:
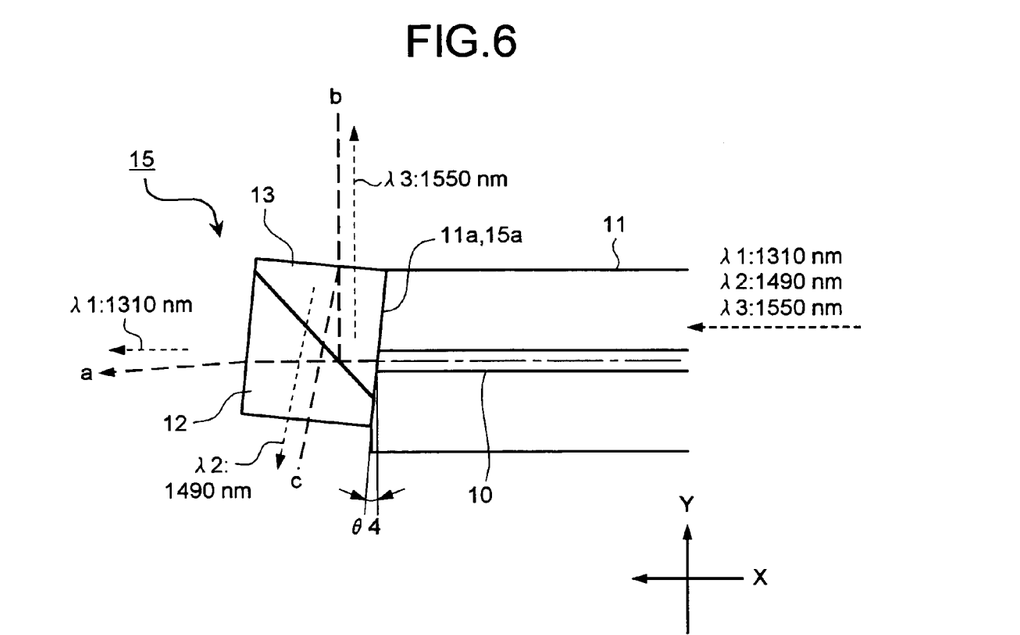
FIG. 6 illustrates an example of a configuration of the wavelength division element.

FIG. 6 illustrates one example of a configuration of the wavelength division element according to the second embodiment. The filters 12 and 13 are coupled with each other to form one cube. As shown in FIG. 6, the wavelength division element may be constituted so that lights emitted from the optical fiber 11 provided along the X-axis direction are incident on an incident surface 15a of the wavelength division element 15. Therefore, an emission surface 11a of the optical fiber 11 is inclined by a method such as grinding and has a tilt angle θ4 equal to the angle θ2 (6 degrees). The incident surface 15a of the wavelength division element 15 may be coupled with the emission surface 11a by an adhesive or the like. Thus, by directly coupling the wavelength division element 15 with the optical fiber 11, optical axis adjustments can be made easily with high accuracy and the components can be assembled easily. Further, size of the wavelength division element 15 reduces, and the number of parts of the wavelength division element 15 reduces.

The light obtained by multiplexing lights in the wavelength bands $\lambda 1$, $\lambda 2$, and $\lambda 3$ is transmitted over the optical fiber 11. The light in the optical path 10 is emitted from the emission surface 11a toward the wavelength division element 15. The light in the wavelength band $\lambda 1$ is transmitted in the direction a, the light in the wavelength band $\lambda 2$ is transmitted in the direction c, and the light in the wavelength band $\lambda 3$ is transmitted in the direction b by the wavelength division element 15. By arranging light receiving elements such as photodiodes ("PD") in the directions a, b, and c, respectively, different optical signals can be detected based on the respective wavelengths. By arranging light emitting elements such as laser diodes ("LD"), the wavelength division element 15 can emit (output) the light in any one of the wavelength bands to the optical fiber 11.

With the configuration of the second embodiment of the present invention, the filter 12 possesses the wavelength characteristics of transmitting the lights in different wavelength bands based on the incident angles. Thus, the same filter (filter 12) can separate the lights in two different wavelength bands by changing the incident angles of the lights incident on the filter 12 and the lights reflected by the filter 13. A divided wavelength width when carrying out the wavelength division using the filter 12 is as large as 120 nm. Thus, the divided wavelength width can be set large, and optical isolation characteristics in the respective wavelength bands $\lambda 1$, $\lambda 2$, and $\lambda 3$ can be improved. In addition, the optical transmission members 12a and 13a made of glass or the like are formed into a cube, and the cube is divided into two halves on the division surface 14, to thereby form the filters 12 and 13. By forming the filter films 12b and 13b on the optical transmission members 12a and 13a, respectively, and coupling division surfaces 14 with each other, the filters 12 and 13 can be handled as one cubic wavelength division element 15. Further, size of the wavelength division element 15 reduces, and the element 15 can be handled easily. Consequently, the optical axis adjustments and assembling the wavelength division element can be more accurate. Furthermore, the filter 13 is provided in the direction of the lights reflected by the filter 12. Therefore, if the distance of the filter 13 from the optical path 10 decreases, size of the wavelength division element 15 further reduces.

A third embodiment of the present invention will be explained. A wavelength division element according to the third embodiment is identical in configuration to the wavelength division element according to the second embodiment except that bandpass filters are additionally provided. Like elements as those in the second embodiment are designated by like reference symbols. The third embodiment is intended to further improve the optical isolation characteristics in the wavelength bands λ1, λ2, and λ3.

Figure 7:
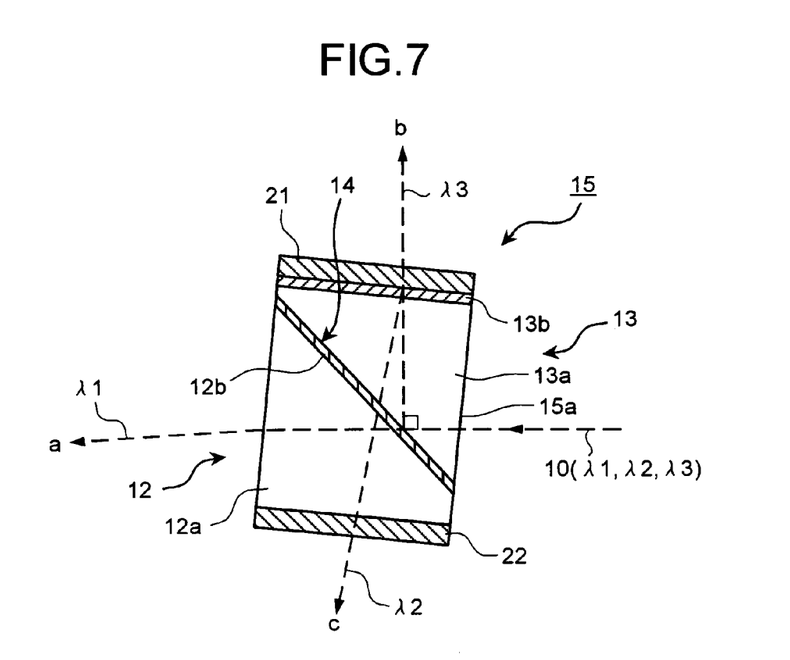
FIG. 7 is a block diagram of a wavelength division element according to a third embodiment.

FIG. 7 is a block diagram of a wavelength division element according to a third embodiment of the present invention. ""Light that is emitted is made to pass through the bandpass filter, which is provided in the direction of emission of light, and which improves the optical isolation in each wavelength band. In FIG. 7, bandpass filters 21 and 22 are provided in the direction b in which the light in the wavelength band λ3 is emitted (1.55-micrometer band) and in the direction c in which the light in the wavelength band λ2 (1.49-micrometer band) is emitted, respectively.

Figure 8:
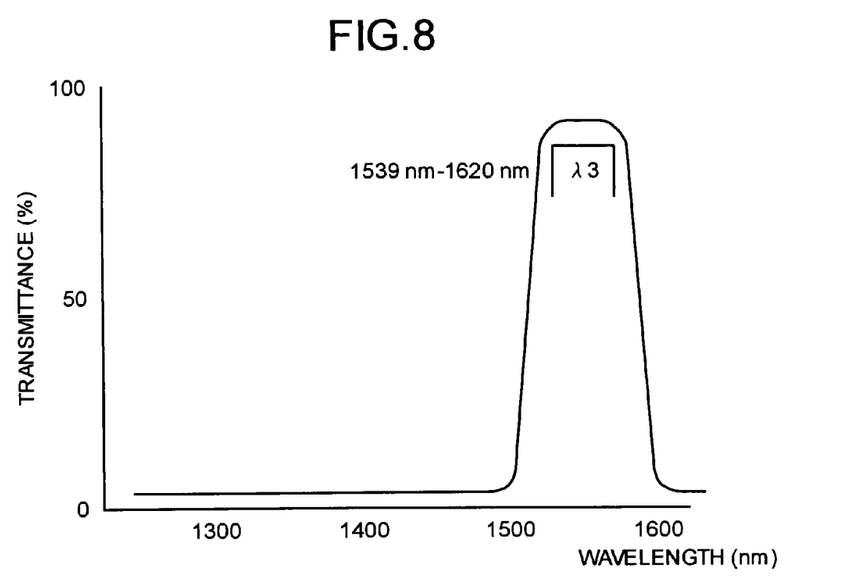
FIG. 8 is a graph of wavelength characteristics of one of two bandpass filters.

FIG. 8 is a graph of the wavelength characteristics of the bandpass filter 21. The bandpass filter 21, provided in the direction b of emission of light from the wavelength division element 15, has wavelength characteristics of transmitting only lights having wavelengths in the wavelength band λ3 (1.55-micrometer band: 1539 nm to 1620 nm). The bandpass filter 21 is fixed onto the filter film 13b of the filter 13 with an adhesive such as an epoxy adhesive or a UV curable resin.

Figure 9:
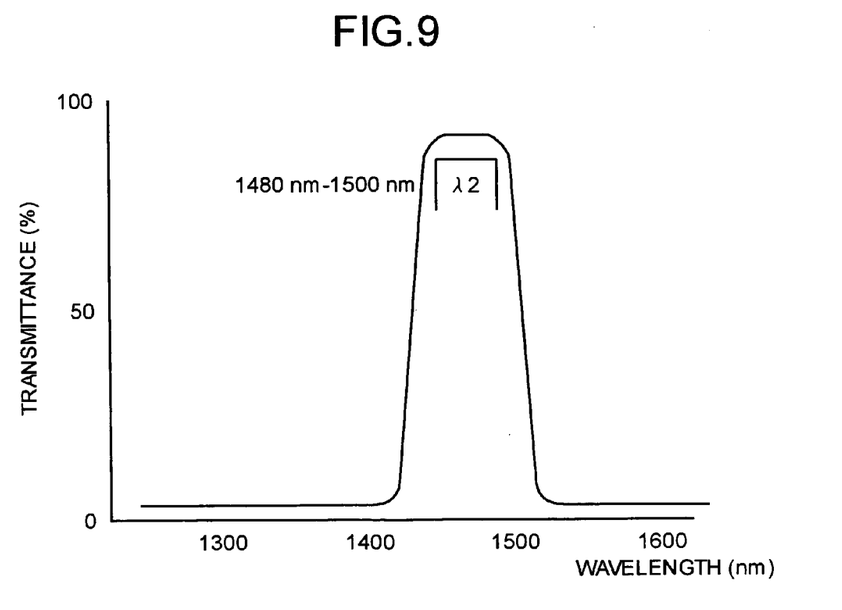
FIG. 9 is a graph of wavelength characteristics of the other bandpass filter.

FIG. 9 is a graph of the wavelength characteristics of the bandpass filter 22. The bandpass filter 22, provided in the direction c of emission of light from the wavelength division element 15, has wavelength characteristics of transmitting only lights having wavelengths in the wavelength band λ2 (1.49-micrometer band: 1480 nm to 1500 nm). The bandpass filter 22 is fixed onto the filter 12 by the same adhesive that is used for fixing the bandpass filter 21. No filter film is provided on the emission surface of the filter 12 in the direction c. Therefore, the filter film having the wavelength characteristics of a bandpass filter may be directly provided in this portion of the filter 12.

The configuration of providing the bandpass filters on the cubic wavelength division element 15 of the second embodiment has been explained above. Alternatively, the bandpass filters may be provided at emission positions of lights in the respective wavelength bands λ1, λ2, and λ3 (in the directions a, b, and c) of the two filters 2 and 3 of the first embodiment. For the filter 2 (see FIG. 1), the directions a and c are set on the same surface of the optical transmission member 2a. Therefore, film type bandpass filters with wavelength characteristics and separated by a border, may be provided on the emission surface in the path of directions a and c, respectively.

Thus, according to the third embodiment, the bandpass filters are provided, whereby only the light in the desired wavelength band is emitted from the emission surface. Accordingly, the optical isolation characteristics in the respective wavelength bands further improve in addition to the advantages of the second embodiment.

A fourth embodiment according to the present invention will be explained next. In the fourth embodiment of the present invention, an example of the configuration of an optical module that uses the wavelength division element according to each of the preceding embodiments will be explained. Using the wavelength division element, wavelength-multiplexed lights can be separated based on wavelength bands and then emitted. The wavelength division element not only demultiplexes the light based on wavelength bands but also multiplexes lights in desired wavelength bands. Such a wavelength division element can separate lights in predetermined wavelength bands in one optical module connected to a transmission line such as an optical fiber, and emit the lights. In addition, the wavelength division element can multiplex the lights in the predetermined wavelength bands in the same optical module, and allow the multiplexed lights to be incident on the optical module (input the multiplexed lights into the optical module).

Figure 10:
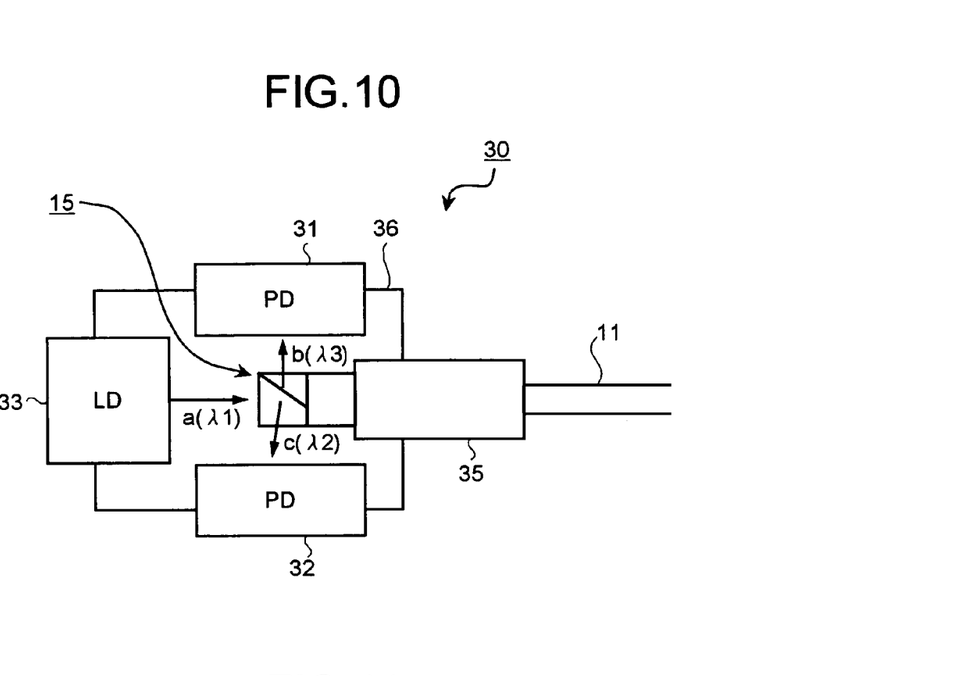
FIG. 10 illustrates an example of a configuration of an optical module according to a fourth embodiment.

FIG. 10 illustrates an example of a configuration of an optical module according to the fourth embodiment. The optical fiber 11 transmits lights in the respective wavelength bands λ1, λ2, and λ3. Similar to the preceding embodiments, the wavelength division element 15 emits the light in the wavelength band λ2 in the direction c, and the light in the wavelength band λ3 in the direction b. The light in the wavelength band λ1 is incident on the wavelength division element 15 from the direction a.

The optical module 30 includes a light receiving element 31 such as a PD that detects the light in the wavelength band λ3 emitted in the direction b from the wavelength division element 15, a light receiving element 32 such as PD that detects the light in the wavelength band λ2 emitted in the direction c, and a light emitting element 33 such as an LD that emits the light in the wavelength band λ1 in the direction a towards the wavelength division element 15. The lights in the respective wavelength bands λ1, λ2, and λ3 can be in the form of signals independent of one another. The optical module 30 can be constituted, for example, so that the light receiving element 31 may be an analog PD that detects the optical signal in the wavelength band λ3 and the light receiving element 32 may be a digital PD that detects the optical signal in the wavelength band λ2. The light receiving elements 31 and 32, the light emitting element 33, and a ferrule 35 are attached to a housing 36 with optical axes positioned.

Figure 11:
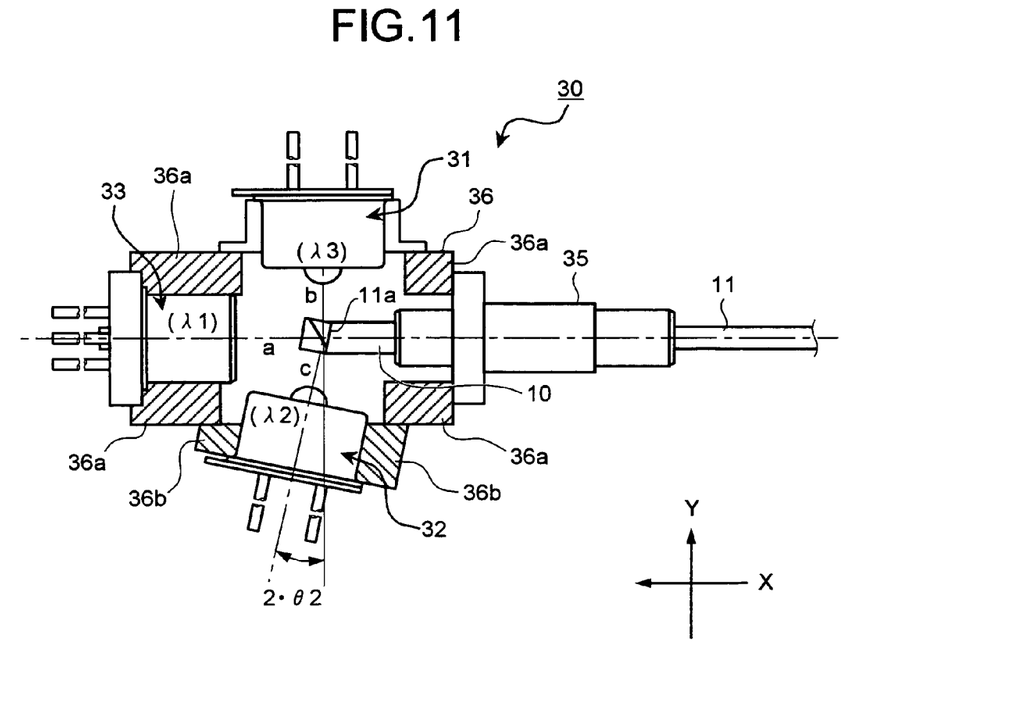
FIG. 11 is a plan view of a specific configuration of the optical module.

FIG. 11 is a plan view of a specific configuration of the optical module 30. The optical fiber 11 is positioned and fixed to the housing 36 through the ferrule 35. A tip (an emission surface 11a) of the optical fiber 11 is located substantially in the center of the housing 36. The emission surface 11a forms a predetermined tilt angle θ4, and the wavelength division element 15 is attached to the emission surface 11a (see FIG. 6). The light receiving element 31 receives the light in the wavelength band λ3 emitted from the wavelength division element 15 and is provided in the direction of the Y-axis. The optical path is along the X-axis, which is orthogonal to the Y-axis. Similarly, the direction a of the light in the wavelength band λ1 to be incident on the wavelength division element 15 is along the X-axis direction, and the light emitting element 33 is provided in the direction a. The light receiving element 32 receives the light in the wavelength band λ2 emitted from the wavelength division element 15 and is provided at a predetermined tilt angle (2·θ2) of 12 degrees relative to the Y-axis.

The light receiving elements 31 and 32 may be inserted into or fixed to a sidewall 36a of the housing 36. If the light receiving element 31 and the light emitting element 33 are provided along the Y-axis and X-axis, respectively, the optical module can be easily assembled. The light receiving element 32 is fixed to the sidewall 36a of the housing 36 through a holding member 36b that holds the light receiving element 32 at a tilt angle (2θ·2) relative to the Y-axis.

The configuration of the optical module 30 houses the cubic wavelength division element 15 of the second embodiment in the housing 36. However, the present invention is not limited to this configuration. The optical module 30 may house the wavelength division element 15 with bandpass filters, described in the third embodiment. Further, the filters 2 and 3 of the first embodiment may be provided in the housing 36 through holding members (not shown).

According to the fourth embodiment explained so far, the optical fiber and the light receiving elements for the respective wavelength bands are incorporated into the housing. Hence, the optical module detects lights, in a plurality of wavelength bands, transmitted through the optical fiber. In addition, it is possible to allow the light in the predetermined wavelength band to be incident on the optical fiber using the light emitting element and to transmit a signal. Thus, the optical module according to the fourth embodiment can be provided in a transmission and reception terminal or the like that transmits and receives signals in a plurality of wavelength bands through the optical fiber. The optical module can transmit and receive high-speed wideband bidirectional signals.

Figure 12:
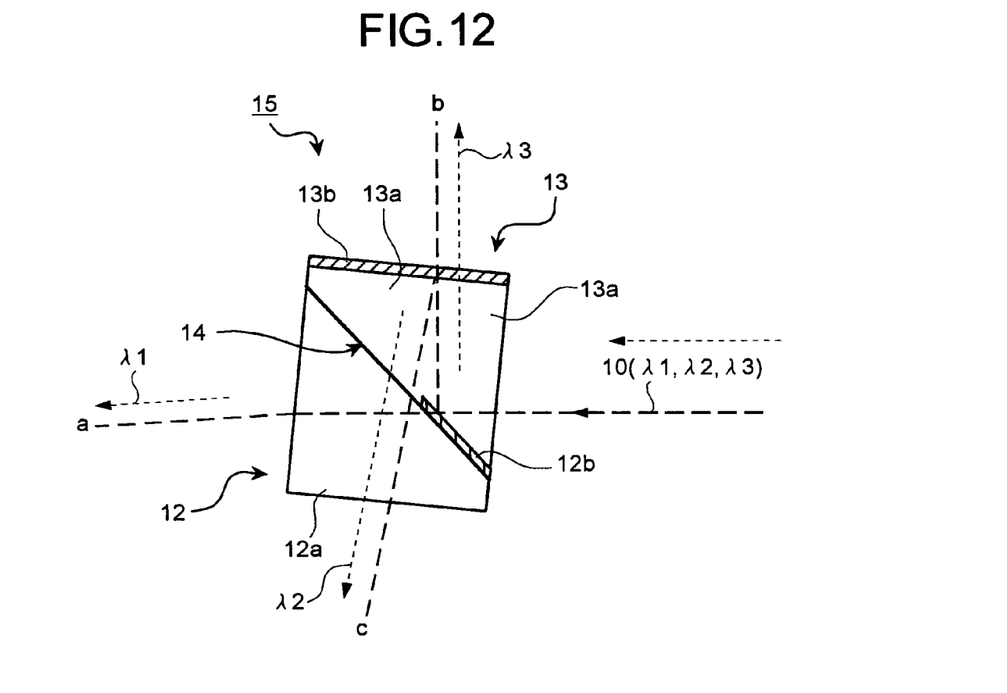
FIG. 12 is a block diagram of a wavelength division element according to a fifth embodiment.

A fifth embodiment of the present invention will be explained next. The configuration of the fifth embodiment is such that the arrangement position of the filter film 12b of the filter 12 according to the second embodiment (see FIG. 5) is limited. FIG. 12 is a block diagram of a wavelength division element according to the fifth embodiment. In the fifth embodiment, similar to the second embodiment, the cubic wavelength division element 15 is used and the wavelength division element 15 includes the two filters 12 and 13. The arrangement of the filter film 12b formed on the division surface 14 on the filter 12 is different from that according to the second embodiment. Namely, the filter film 12b is formed only in a portion of the division surface 14, where the multiplexed lights in the wavelength bands $\lambda 1$, $\lambda 2$, and $\lambda 3$ in the optical path 10 are incident.

The filter film 12b transmits the light in the wavelength band $\lambda 1$ in the direction a, and reflects the lights in the remaining wavelength bands $\lambda 2$ and $\lambda 3$. The filter film 13b, provided on the other filter 13, is provided on the surface of the filter 13 from which the lights are emitted, similar to the second embodiment. The filter film 13b transmits and emits, in the direction b, the light in the wavelength band $\lambda 3$, and reflects the light in the wavelength band $\lambda 2$. The reflected light in the wavelength band $\lambda 2$ is transmitted through the filter 12 in the direction c without passing through the filter film 12b.

With this configuration, the filter film 12 need not have an incident angle dependency to reflect or transmit a light based on the incident angle of the light, as explained in the second embodiment.

According to the fifth embodiment explained so far, the light in the wavelength band $\lambda 2$, subjected to wavelength division and reflected by the filters 12 and 13, can be emitted without being incident on the filter 12 again. Therefore, unlike the second embodiment, changing the incident angle of the light relative to the filter 12 again, causing the light to be incident on the filter 12, and subjecting the light to wavelength division by the filter 12, can be omitted. Consequently, the construction of the wavelength division element is easier, as compared with the second embodiment.

Figure 13:
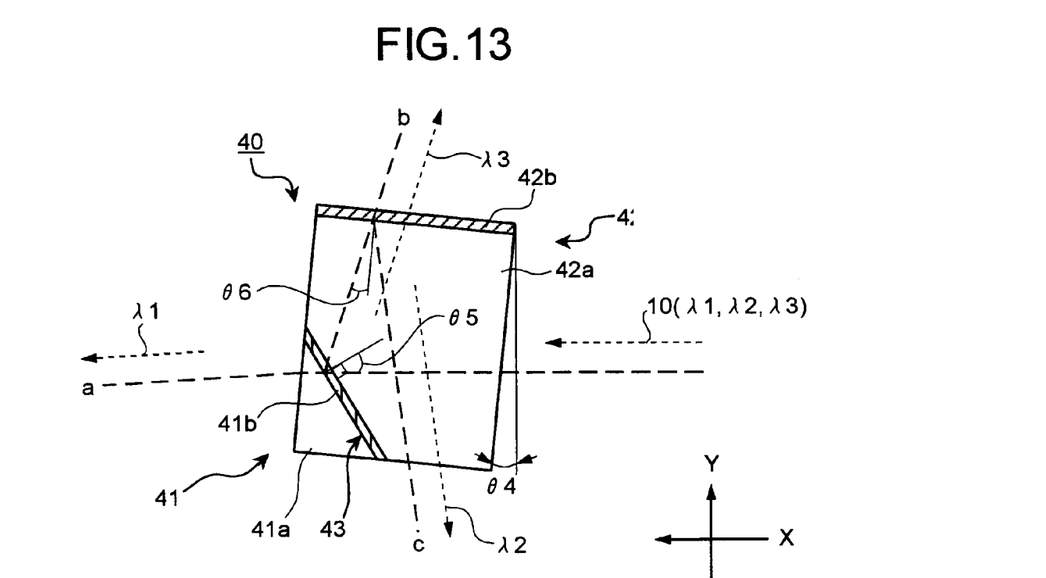
FIG. 13 is a block diagram of a wavelength division element according to a sixth embodiment.

A sixth embodiment of the present invention will be explained next. The configuration of the sixth embodiment is such that the arrangement of the filter films is changed to emit the lights in the respective wavelength bands in different emission directions. FIG. 13 is a block diagram of a wavelength division element according to the sixth embodiment. Similar to the second embodiment, a cubic wavelength division element 40 is used. The wavelength division element 40 includes two filters 41 and 42. Optical transmission members 41a and 42a, which are constituent elements of the respective filters 41 and 42, are made of the glass or the like, similar to those according to the second embodiment (FIG. 5). A surface of the wavelength division element 40, on which light from the optical path 10 is incident, forms a predetermined angle ($\theta 4$) relative to the optical path 10 (X-axis). A division surface 43 divides the wavelength division element 40 into the filters 41 and 42. A predetermined angle $\theta 5$ is formed between a normal of the division surface 43 and the optical path 10. The lights in the wavelength bands $\lambda 1$, $\lambda 2$, and $\lambda 3$ are multiplexed on the optical path 10. A filter film 41b is formed on the division surface 43 on the filter 41.

The filter film 41b transmits the light in the wavelength band $\lambda 1$ in the direction a, and reflects the lights in the remaining wavelength bands $\lambda 2$ and $\lambda 3$. A filter film 42b is provided on a surface of the other filter 42 from which light is emitted in the direction in which the light is reflected by the filter film 41b. A surface of the filter film 42b forms the angle $\theta 4$ relative to the optical path 10 (X-axis). A normal line of the filter film 42b forms the predetermined angle $\theta 6$ relative to the incident light. The filter film 42b transmits and emits the light in the wavelength band $\lambda 3$ in the direction b, and reflects the light in the wavelength band $\lambda 2$. The reflected light in the wavelength band $\lambda 2$ is emitted in the direction c. Namely, the light in the wavelength band $\lambda 2$ is emitted from the filter 42, on which the filter film 42b is formed, in the direction c without passing through the division surface 43.

The sixth embodiment differs from the second embodiment in that the light in the wavelength band $\lambda 2$ reflected by the two filter films 41b and 42b is emitted in the direction c without being incident on the filter film 41b again. Therefore, position of the division surface 43 is appropriately determined so as not to arrange the filter film 41b (on the division surface 43) in the direction c in which the light in the wavelength band $\lambda 2$ is emitted. If the angle $\theta 5$ is 45 degrees, the filter film 41b possesses the wavelength characteristics indicated by the solid line in FIG. 2, and the filter film 42b possesses the wavelength characteristics shown in FIG. 3. Therefore, a divided wavelength width when wavelength division is carried out using the filter film 41b can be set at 120 nm. Thus, the wavelength division element 40 has a large divided wavelength width similar to the first and the second embodiments. This divided wavelength width is (see FIG. 2) between the largest wavelength of 1360 nm in the wavelength band $\lambda 1$ and the smallest wavelength of 1480 nm in the wavelength band $\lambda 2$.

With such configuration of the wavelength division element 40, the filter film 41b need not have the incident angle dependency to reflect or transmit a light based on the incident angle of the light, as explained in the preceding embodiments. Light receiving elements that detect lights in the wavelength bands $\lambda 1$, $\lambda 2$, and $\lambda 3$ can be arranged in the direction of emission of the lights in the wavelength bands $\lambda 1$, $\lambda 2$, and $\lambda 3$, respectively. Moreover, the light in one of the wavelength bands $\lambda 1$, $\lambda 2$, and $\lambda 3$ emitted from a light emitting element can be made incident on the wavelength division element.

According to the sixth embodiment, the divided wavelength width can be thus set large, and optical isolation characteristics in the respective wavelength bands $\lambda 1$, $\lambda 2$, and $\lambda 3$ can be improved. In addition, the optical transmission members 41a and 42a made of glass or the like are formed into a cube, and the cube is divided into two halves on the division surface 43. By forming the filter films 41b and 42b on the optical transmission members 41a and 42a, respectively, and coupling the division surfaces 43 with each other, the filters 41 and 42 can be handled again as one cubic wavelength division element 40. Thus, accuracy in optical axis and assembly improves. Further, according to the sixth embodiment, the light in the wavelength band λ2 subjected to wavelength division and reflected by one of the filters (filter 41) can be directly emitted from the other filter 42 merely by setting the reflection angle appropriately. Accordingly, unlike the first and the second embodiments, it is unnecessary to change the incident angle of the light relative to the filter 41 again, cause the light to be incident on the filter 41, and subject the light to wavelength division by the filter 41. Consequently, the construction of the wavelength division element is easier, as compared with the first and the second embodiments.

A seventh embodiment of the present invention will be explained next. The configuration of the seventh embodiment is such that the optical path of one of the lights in the respective wavelength bands emitted from the wavelength division element is different from that in each preceding embodiment. The configuration of changing the optical path of the light in the wavelength band λ2 emitted from the cubic wavelength division element according to the second embodiment (see FIG. 5) to an optical path in the Y-axis direction will be explained.

Figure 14:
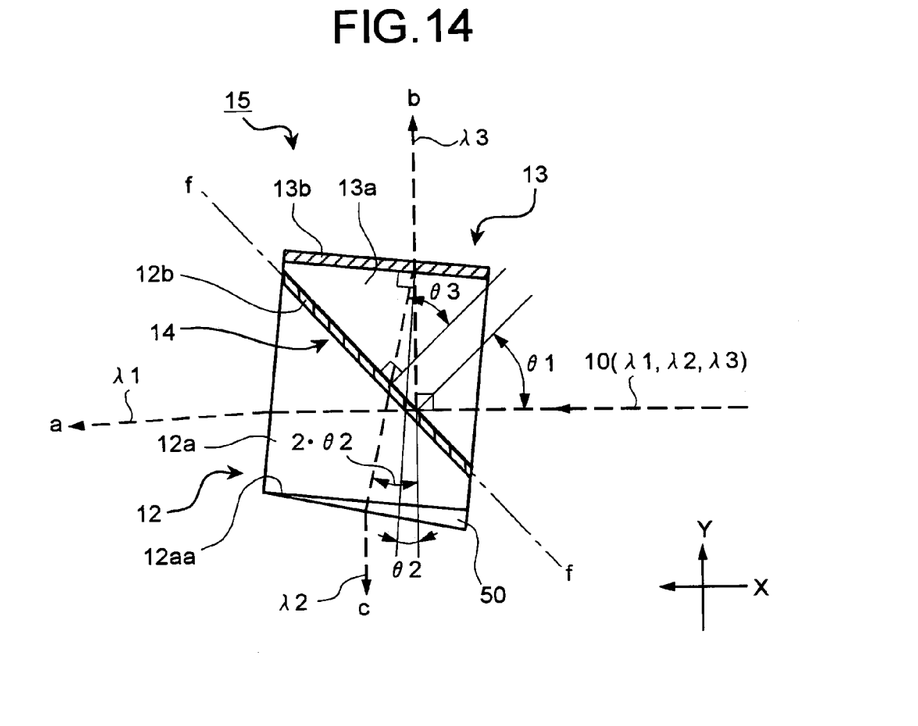
FIG. 14 is a block diagram of a wavelength division element according to a seventh embodiment.

FIG. 14 is a block diagram of a wavelength division element according to a seventh embodiment. The light in the wavelength band λ1 and the light in the wavelength band λ3 are emitted from the wavelength division element 15 in the direction a along the X-axis and the direction b along the Y-axis, respectively. However, the light in the wavelength band λ2 reflected is inclined at a predetermined angle (2·θ2=12 degrees) relative to the Y-axis. Therefore, only for the light in the wavelength band λ2, it is necessary to make adjustments for optical axis alignment. Instead, an optical path changing member 50 that changes the optical path of the light in the wavelength band λ2 is attached with an adhesive to a surface 12aa of the wavelength division element 15, from which the light in the wavelength band λ2 is emitted.

The optical path changing member 50 is made from the same glass as that used for the optical transmission member 12a of the wavelength division element 15, and having an emission surface 50a formed into a wedge shape in the direction of the X-axis. Therefore, the optical path changing member 50 functions as a prism and corrects the optical path of the light in the wavelength band λ2 to the optical path in the direction c in the Y-axis direction. The optical path changing member 50 can change optical paths of the lights in each wavelength bands that are incident on and emitted from the wavelength division element 15. For example, the optical path changing member 50 can correct a deviation in the emission direction of a light at a predetermined angle relative to the X-axis or Y-axis. The optical path changing member 50 can also be used for bending the optical path to emit a light in a desired direction using a triangular prism or the like. The optical path changing member 50 can be directly attached, with an adhesive, to the cubic wavelength division element according to the second embodiment. If the wavelength division element includes separate filters as in the first embodiment, the optical path changing member 50 may be arranged in the optical path of the light emitted from each filter.

According to the seventh embodiment, the optical path of the emitted light can be changed to the optical path in a desired direction. Consequently, labor for the optical axis alignment is saved, holding members that hold the light receiving elements in the direction of the deviation are not needed, and assembly operation becomes easier.

According to the wavelength division elements and the optical modules according to the present invention, the divided wavelength width can be set large, and the optical isolation characteristics in the separate wavelength bands can be improved. In addition, light signals in a plurality of wavelength bands can be separated with a simple configuration without an increase in the number of filters. Thus, the number of parts can be reduced, and the wavelength division element and the optical modules can be constructed at a low cost.

According to the wavelength division elements and the optical module according to the present invention, the lights are incident on one filter, which has different wavelength characteristics based on incident angles. A divided wavelength width can be thereby set large. Therefore, it is possible to improve yield relating to formation of the filter films, facilitate forming the filter films, and realize a low cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wavelength division element into which a wavelength-multiplexed light is input, wherein the wavelength-multiplexed light includes a first light in a first wavelength band, a second light in a second wavelength and a third light in a third wavelength band, the wavelength division element comprising:
   a first filter that allows the first light to pass through in a first direction and reflects the second light and the third light in a second direction; and
   a second filter that allows the third light reflected by the first filter to pass through in a third direction that is substantially orthogonal to the first direction, and reflects the second light reflected by the first filter in a fourth direction.

2. The wavelength division element according to claim 1, wherein
   the second filter reflects the second light reflected by the first filter towards the first filter, and
   the first filter allows the second light reflected by the second filter to pass through in a fifth direction.

3. The wavelength division element according to claim 1, wherein
   the first filter is a short wave pass filter (SWPF) that allows lights having shorter wavelengths than a first wavelength to pass through, and
   the second filter is a long wave pass filter (LWPF) that allows lights having longer wavelengths than a second wavelength to pass through.

4. The wavelength division element according to claim 1, wherein
   wavelength characteristics of the first filter varies depending on an incident angle of a light incident on the first filter.

5. The wavelength division element according to claim 1, wherein
   the first filter and the second filter each include a plate film.

6. The wavelength division element according to claim 1, wherein
   the first filter is formed on a first member of a cube,
   the second filter is formed on a second member of the cube, and the first member and the second member are coupled to form the cube so that the second light and the third light reflected by the first filter are incident on the second filter.

7. The wavelength division element according to claim 2, wherein
the wavelength-multiplexed light is incident on the first filter at an incident angle of θ1.
the second light and the third light reflected by the first filter are incident on the second filter at an incident angle of θ2, and
the second light reflected by the second filter is incident on the first filter at an incident angle of θ3 having a value of θ1−2Xθ2.

8. The wavelength division element according to claim 7, wherein the incident angle θ1 is 45 degrees, and the incident angle θ2 is 6 degrees.

9. The wavelength division element according to claim 3, wherein
the first wavelength is set between the first wavelength band and the second wavelength band, and the second wavelength is set between the second wavelength band and the third wavelength band.

10. The wavelength division element according to claim 1, further comprising:
a first bandpass filter that allows the second light reflected by the second filter and allowed to pass through the first filter, and
a second bandpass filter that allows the third light allowed to pass through the second filter.

11. The wavelength division element according to claim 1, further comprising:
an optical path changing member that changes an emission direction of any one of the first light, the second light, and the third light.

12. The wavelength division element according to claim 7, wherein
the cube is attached to a tip of an optical fiber from which the wavelength-multiplexed light is input.

13. The wavelength division element according to claim 12, wherein
the second light and the third light reflected by the first filter are incident on the second filter at an incident angle of θ,
an emission edge of the optical fiber is inclined at an angle coincident with the incident angle θ.

14. The wavelength division element according to claim 11, wherein
the optical path changing member changes the emission direction so that the first light, the second light, and the third light become substantially orthogonal to one another.

15. The wavelength division element according to claim 6, wherein
the second light reflected by the second filter is emitted from the cube without being incident on the first filter again.

16. An optical module into which a wavelength-multiplexed light is input, wherein the wavelength-multiplexed light includes a first light in a first wavelength band, a second light in a second wavelength band, and a third light in a third wavelength band, the optical module comprising:
a wavelength division element that includes:
a first filter that allows the first light to pass through in a first direction and reflects the second light and the third light in a second direction, and
a second filter that allows the third light reflected by the first filter to pass through in a third direction that is substantially orthogonal to the first direction, and reflects the second light reflected by the first filter in a fourth direction, and
a plurality of light receiving elements that receive the first light from the first filter, the second light from the first filter, and the third light from the second filter, respectively.

17. The optical module according to claim 16, wherein
the second filter reflects the second light reflected by the first filter towards the first filter, and
the first filter allows the second light reflected by the second filter to pass through in a fifth direction.

18. The optical module according to claim 16, wherein
the first filter is a short wave pass filter (SWPF) that allows light having shorter wavelengths than a first wavelength to pass through, and
the second filter is a long wave pass filter (LWPF) that allows lights having longer wavelengths than a second wavelength to pass through.

19. The optical module according to claim 16, further comprising:
a light emitting element that causes lights in a predetermined wavelength band to be incident on the wavelength division element.

20. The optical module according to claim 16, wherein
the wavelength division element is a cube,
the first filter is formed on a first member of the cube,
the second filter is formed on a second member of the cube, and
the first member and the second member are coupled to form the cube so that the second light and the third light reflected by the first filter are incident on the second filter.

21. The optical module according to claim 20, wherein
the wavelength division element is attached to a tip of an optical fiber from which the wavelength-multiplexed light is input.

22. The optical module according to claim 16, further comprising:
a first bandpass filter that allows the second light reflected by the second filter and allowed to pass through the first filter, and
a second bandpass filter that allows the third light allowed to pass through the second filter.

* * * * *

UNITED STATES PATENT AND TRADEMARK OFFICE
CERTIFICATE OF CORRECTION

| | | |
|---|---|---|
| PATENT NO. | : 7,215,885 B2 | Page 1 of 1 |
| APPLICATION NO. | : 10/898336 | |
| DATED | : May 8, 2007 | |
| INVENTOR(S) | : Takashi Yamane et al. | |

It is certified that error appears in the above-identified patent and that said Letters Patent is hereby corrected as shown below:

Column 15, Line 8, change "$\theta1.$" to --$\theta1,$--.

Signed and Sealed this

Twenty-first Day of August, 2007

JON W. DUDAS
*Director of the United States Patent and Trademark Office*